2,814,710

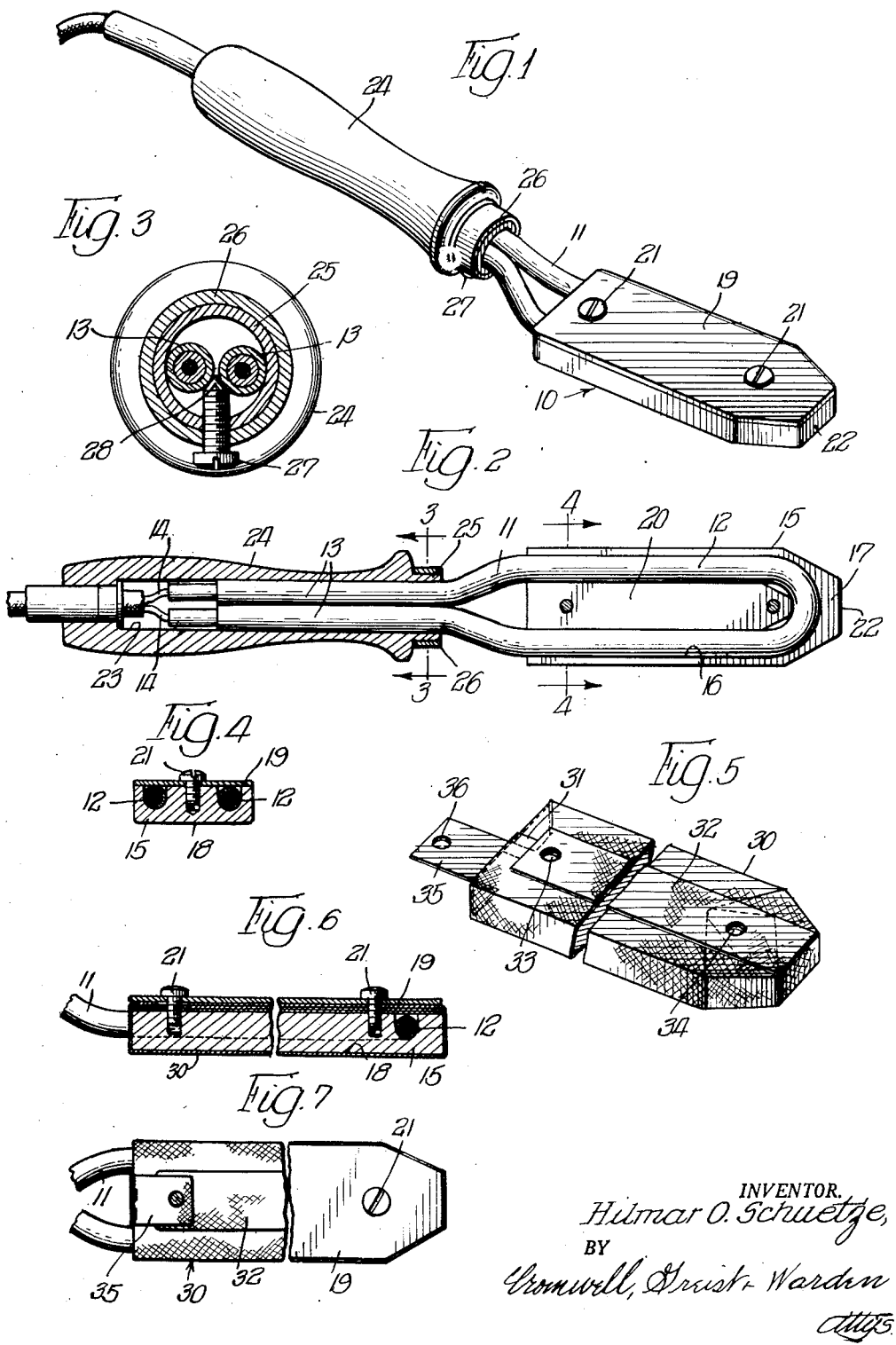

HAND SEALER

Hilmar O. Schuetze, Chicago, Ill., assignor to Great Lakes Stamp & Mfg. Co., Inc., Chicago, Ill., a corporation of Illinois Application February 28, 1955, Serial No. 490,906

3 Claims. (Cl. 219—21)

This invention relates to heat sealing devices and is more particularly concerned with improvements in a hand tool especially adapted for use in heat sealing packages.

It is a general object of the invention to provide a hand tool for use in forming heat seals in packaging operations which tool is simple in construction, light in weight, sturdy, and economical to manufacture.

It is a more specific object of the invention to provide improvements in a heat sealing tool which comprises a generally U-shaped element provided with means for electrically heating the same, which element is encased in a heat transfer shoe and has unheated extensions which are brought into parallel side-by-side relation and secured in a hollow handle by a clamping collar and an exteriorly accessible screw threaded into the collar and extending through the underlying wall of the handle into wedged engagement with the extensions on the element.

It is another object of the invention to provide a heat sealing tool comprising a Calrod heating unit arranged within a tubular heating element which is bent into the form of a loop and has end portions secured within a hollow handle and a replaceable heat transfer shoe casing which encloses the looped end section of the heating element.

It is another object of the invention to provide a heat sealing tool of the type described in which the transfer shoe is provided with a cover of relatively thin fabric-like plastic material which will not adhere to the plastic films used in packaging when the latter are heated sufficiently to form a satisfactory seal.

These and other objects and advantages of the invention will be apparent from a consideration of the sealing tool which is shown by way of illustration in the accompanying drawings, wherein:

Fig. 1 is a perspective view of a heat sealing tool embodying the principal features of the invention;

Fig. 2 is a longitudinal cross section through the tool;

Fig. 3 is a transverse cross section taken on the line 3—3 of Fig. 2, to an enlarged scale;

Fig. 4 is a transverse cross section taken on the line 4—4 of Fig. 2;

Fig. 5 is a perspective view of a cover for the heat transfer shoe of the tool;

Fig. 6 is a longitudinal section, with portions broken away, of the heat transfer shoe with the cover shown in Fig. 5 positioned thereon; and Fig. 7 is a plan view, with portions broken away, of the covered shoe shown in Fig. 6.

Referring to the drawings there is illustrated a heat sealing tool 10 which incorporates therein the principal features of the invention and which is particularly adapted for use in making heat activated seals in numerous packaging operations.

The illustrated tool 10 comprises a heat transfer element or member 11 in the form of a metal tube of relatively small cross section which is looped or bent upon itself to form a generally U-shaped heated end section 12 and end extensions 13 which are unheated. The heat transfer member 11 is provided with a Calrod heating element (not shown) in the heated end section 12 having suitable lead wires, indicated at 14, through which current is supplied from a suitable source, the Calrod unit and its current conducting lead wires 13 being electrically insulated from the member 11. The tubular heat transfer member 11 is formed of a material which will readily transfer the heat from the Calrod unit to an applicator shoe or casing 15.

The heat transfer shoe or applicator casing 15 is generally rectangular in cross section and provided with a U-shaped groove or recess 16 which opens on one side face 17 thereof. The opposite side face 18 of the shoe 15 forms the surface for applying the heat to the member to be sealed. The open side face 17 of the casing 15 is provided with a cover member 19 which is secured to the rib-like center portion 20 of the casing 15 by a pair of clamping screws 21. The casing 19 is cut away at the forward corners to provide a somewhat narrower end portion 22.

The applicator shoe or casing 15 is preferably formed of a very light metal such as aluminum or an aluminum alloy which will readily transfer the heat from the element 12 through the operating face 18 to the object to be heated. The cover plate 19 may be of a similar metal.

The unheated end extensions 13 of the heat transfer member 11 are brought together in side-by-side relation and inserted within the bore 23 of a hollow handle member 24 with the connecting elements 14 which supply the current to the Calrod unit extending through the outer end of the handle 24. The handle 24, which may be of wood or similar material, is provided with a shoulder 25 at its end and a metal ferrule or clamping band 26 surrounds the same. A set screw 27 is engaged in a threaded aperture in the ferrule 26 and passes through an aligned aperture in the shoulder 25 and engages between the extensions 13 with the end 28 of the screw 27 being beveled or pointed to form a wedge so that it acts to force the extensions 13 into tight engagement with the adjacent portions or surfaces of the internal wall of the handle. The end of the handle 24 adjacent the shoe casing 15 is spaced somewhat from the latter.

In order to adapt the tool 10 for use with plastic film materials, for example "Pliofilm," which are rendered tacky or sticky so that they cling to many metals and other surfaces, when subject to seal forming temperatures, the shoe casing 15 may be provided with a cover member 30 which is preferably formed from a plastic film material, which is not affected by the temperatures required for the sealing of "Pliofilm" and similar plastic films which are commonly employed in packaging operations, and which has a smooth surface to which the tacky packaging material will not cling. Preferably the cover 30 is formed of "Teflon" which is a plastic material manufactured by E. I. du Pont de Nemours Co. and understood to be a tetrafluoroethylene polymer. The cover 30 is cut or shaped from a sheet of the material so that it may be placed over the body of the shoe 15. In the illustrated form of the device the cover 30 is folded over the bottom surface 18 of the shoe casing 15 to provide a smooth operating surface and the margins are overlapped at 31 on the upper side of the open face 17 of the shoe casing 15, the metal clamp plate 19 being removed for positioning of the cover sleeve 30. A reinforcing strip 32 may be employed over the overlapped seams 31 and provided with suitable apertures 33 and 34 for accommodating the fastening screws 21. The cover 30 includes a tab or flap forming portion 35 which is adapted to extend between the legs of the heat transfer unit 11 and which is provided with a hole 36 so that it may be folded to align the hole 36 with the hole 33 for receiving the fastening screw 21, The clamp plate 19 is placed over the top of the sleeve 30 after it is in position and the fastening screws are inserted and tightened to hold the cover 30 firmly in position on the shoe.

While specific details of construction and particular materials are referred to in describing the illustrated form of the tool it will be understood that other materials and other details of construction may be resorted to within the spirit of the invention.

I claim:

1. A hand sealer comprising an element having a generally U-shaped end portion and provided with means for electrically heating the same, the leg portions of said element being provided with unheated extensions which are brought together into parallel side-by-side relation, a hollow handle telescoped over said unheated extensions, a readily removable heat transfer shoe encasing the heated end of the element in longitudinally spaced relation to the handle, and means for detachably securing said unheated extensions within the handle consisting of a ferrule surrounding a shoulder forming portion on the end of the handle and an exteriorly accessible screw threaded in said ferrule and having its threaded end extending through the underlying wall of the handle into wedged engagement with and between said unheated extensions of said element.

2. A tool for hand sealing operations comprising a handle member and a heating element of generally U-shaped form having the ends of the leg portions brought together in side-by-side relation and enclosed within adjacent portions of said handle member, means for clamping said leg portions in the handle member, a generally rectangular shoe casing having a groove in a side face thereof for receiving the bight portion and substantial adjoining portions of the legs of said heating element, a closure plate for said groove detachably secured on said shoe casing, and a cover member for said casing which is formed of a "Teflon" film folded about said shoe casing and held in position by said closure plate.

3. A hand sealing tool comprising an elongate handle member having an axial bore and a heating element which is in the form of a reversely bent tube member, said tube member having leg portions which are spaced adjacent the bent end and which come together adjacent the other end thereof to form a generally rectangular loop, the ends of said leg portions being unheated and extending into the axial bore of said handle member, a ferrule arranged on the end portion of said handle member and a clamping screw threaded in said ferrule and extending through the underlying wall of the handle into wedged engagement with and between said leg portions, a generally rectangular removable shoe casing spaced from the end of said handle member and having a U-shaped recess opening on one side face for receiving the bent end and adjoining loop forming leg portions of said tube member, and a removable cover plate for closing said recess and securing the loop portion of said tube member therein.

References Cited in the file of this patent
UNITED STATES PATENTS

| | | |
|---|---|---|
| 1,262,482 | Hales | Apr. 9, 1918 |
| 2,246,719 | Burnham | June 24, 1941 |
| 2,424,558 | Delano | July 29, 1947 |
| 2,497,146 | Warren | Feb. 14, 1950 |
| 2,574,094 | Fener | Nov. 6, 1951 |
| 2,595,597 | Morseth | May 6, 1952 |
| 2,680,188 | Stephens | June 1, 1954 |